United States Patent [19]
Norris

[11] 3,862,572
[45] Jan. 28, 1975

[54] GAUGE GLASS PROTECTING MEANS

[76] Inventor: Orlin R. Norris, 263 Little Street, Belleville, N.J. 07109

[22] Filed: Sept. 20, 1973

[21] Appl. No.: 399,018

[52] U.S. Cl. .............................................. 73/328
[51] Int. Cl. ........................................... G01f 23/02
[58] Field of Search ............ 73/328, 330, 334, 323, 73/324, 325, 326

[56] References Cited
UNITED STATES PATENTS
1,387,676  8/1921  Wright ................................ 73/328

Primary Examiner—Richard C. Queisser
Assistant Examiner—Joseph W. Roskos
Attorney, Agent, or Firm—Omri M. Behr

[57] ABSTRACT

There is provided a novel gauge glass system for high pressure gas liquid systems wherein the gauge glass is provided with a liquid and liquid/gas aerosol deflector means whereby the surface of the gauge glass is kept free from corrosion and deposit.

4 Claims, 10 Drawing Figures

PATENTED JAN 28 1975　　　　　　　　　3,862,572
FIG.1　　FIG.2　　FIG.5
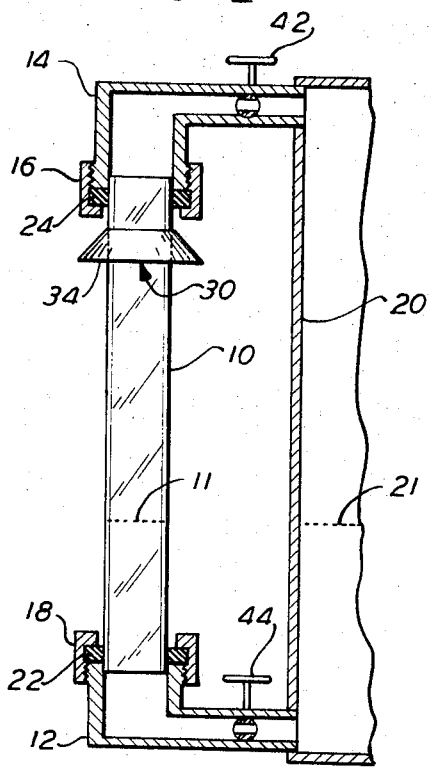
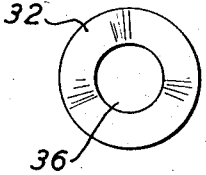
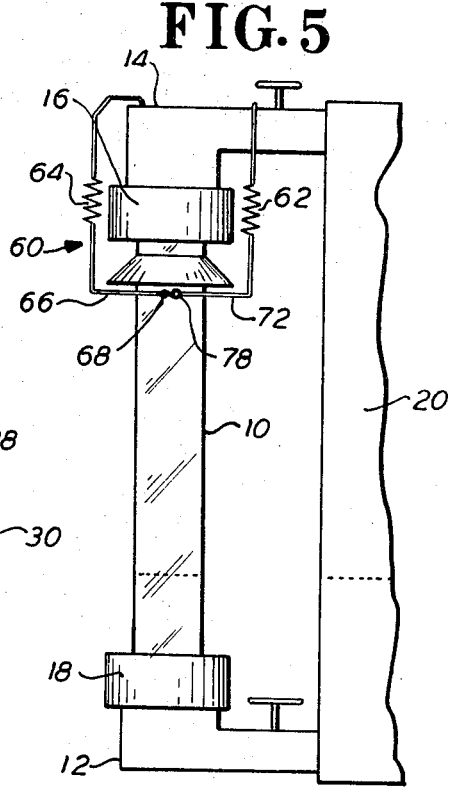
FIG.3
FIG.4
FIG.6　　FIG.7　　FIG.5A
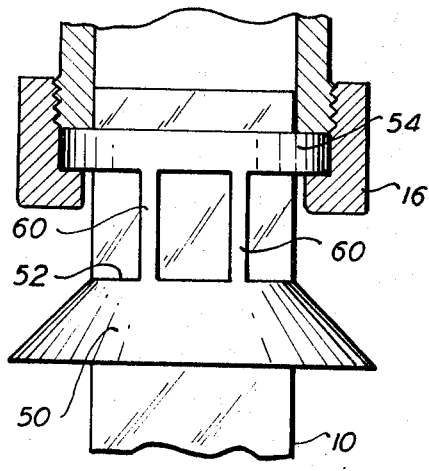
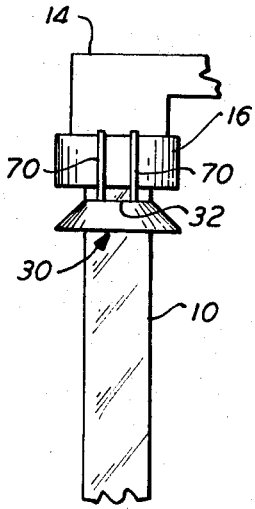
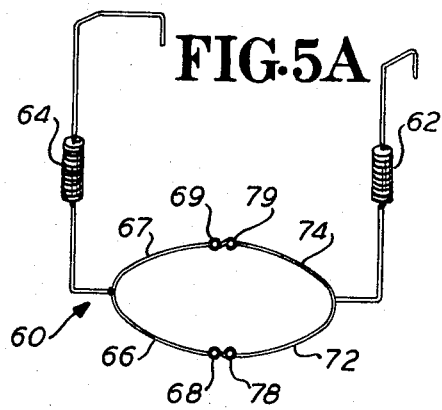
FIG.8
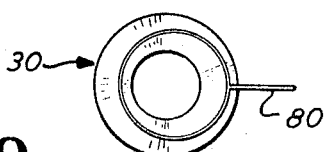
FIG.9

GAUGE GLASS PROTECTING MEANS

DESCRIPTION OF THE PRIOR ART

In the operation of steam raising boilers it is necessary to determine the water level of the boilers on a continuing basis.

It is customary to make this determination by means of an external gauge glass which comprises essentially a thick-walled transparent tube, usually a cylindrical tube, the upper end of which is connected to that portion of the boiler which is permanently in the vapor state and the lower end is connected to that portion of the boiler which should always contain water. The glass itself is located at a level corresponding to that level at which the water level of the boiler should be under satisfactory operative conditions. It is the usual practice to provide valves between the upper, or steam connecting means and the lower or water connecting means. It is the usual practice to keep the valves open at all times.

The criteria for such gauges are well settled and are set forth in the suggested Rules for Care of Power Boilers (1971 Edition) Section VII, Sub-Section C2.201 through 210 and C5.608 through C5.609 (published by The American Society of Mechanical Engineers, New York, New York. It will be clear to those skilled in the art that due to the high pressures and temperatures involved in steam boilers it is desirable to have a tight seal between the gauge glass and the steam and water connecting means thereto. Such a seal is usually provided by means of a rubber gasket which is compressed into place by a sealing nut. Unfortunately, it has been found in practice that under operative conditions it is virtually impossible to maintain an absolutely leak-proof seal due to the degradation of the gasket material under operating conditions. It is clearly impractical to replace the gasket as soon as it begins to deteriorate. It is impossible to maintain an adequate seal for a substantial period of time since a high degree of accuracy in readings is required and in view of the presence of the valves mentioned hereinabove, the sealing gaskets are in constant connection with the boiler. Nevertheless, a price must be paid for this compromise. During the operation of the gauge, that is to say, when the valves in the connecting means are opened, steam and water leak past the seal giving rise to three disadvantages. The first, which is very serious, is the obscuring of the line of vision during the taking of the reading, another which is far more serious in the long term, is the erosion of the surface of the gauge glass and thirdly the deposition thereon of previously dissolved solid material. It has been found that unless these deposits are either prevented or immediately removed they will eventually cloud up the entire visibility of the glass. When it is remembered that these glasses are generally located at a height of about 14 feet above ground level in very close proximity operating boilers at around 400°F it will be realized that keeping these glasses clean is no simple or safe proposition. The nature of this problem has of course been known for many years. One suggested solution is to be found in U.S. Pat. No. 1,234,191, to Mahaley (July 24, 1917) which proposed an automatic gauge glass wiper.

Most of the approaches taken heretofore to avoid this leakage problem have been directed to providing a tighter seal between the gauge glass and the connecting pipes to the boiler. Since these approaches have been substantially unsuccessful, it would be desirable to provide a means for maintaining the clarity of the gauge glasses while in no way interfering with the glass to pipe sealing means.

The problems mentioned hereinabove with respect to steam boilers are equally applicable to oil/ammonia systems used in refrigeration compressors.

SUMMARY OF THE INVENTION

There is provided a gauge glass system for determining liquid level in high pressure gas/liquid systems, for example, the water level in steam generating boilers which is equipped with a steam or water deflecting means located proximate to but not in contact with the junction between the gauge glass and the means connecting said gauge glass to the body of the boiler or water column. This deflecting means serves to avoid the deposition of boiler water upon the surface of the gauge glass. The deflectors also serve to minimize the etching of the surface of the gauge glass by leaking steam.

The deflectors may be provided in a variety of embodiments. In one embodiment the deflectors are not removable from the gauge glass without disassembly of the gauge glass from the boiler connecting means.

In a second embodiment the deflectors may be removed from the gauge glass without disassembly of the gauge glass and from the connecting means.

In a third embodiment the deflectors are provided with a means for maintaining the distance between the said deflector and the junction between the gauge glass and the connecting means to the boiler.

In a fourth embodiment the deflectors are further equipped with a drip wire to lead off the condensation.

The gauge system of the present invention is not limited to water boilers, but includes all systems with similar problems, notably refrigerator compressors operating with oil/ammonia mixtures and the like.

BRIEF DESCRIPTION OF THE DRAWINGS

FIG. 1 shows a side elevational view of the system of the present invention showing deflectors of the first sub-embodiment.

FIG. 2 shows a top plan view of a deflector of the first sub-embodiment.

FIG. 3 shows a top plan view of a deflector of the second embodiment.

FIG. 4 shows a side elevational view of a deflector of the second sub-embodiment.

FIGS. 5 and 5A show a partial side elevational view containing a deflector of the third sub-embodiment.

FIG. 6 shows a side elevational view of a deflector of the fourth sub-embodiment.

FIG. 7 shows a side elevational view detailing deflector separators.

FIG. 8 shows a top plan view of the drip leads on a separator.

FIG. 9 shows a side elevational view detailing drip leads on a separator.

DESCRIPTION OF THE PREFERRED EMBODIMENTS

The system of the present invention comprises a transparent, tubular, gauge glass 10 connected to gas/liquid system 20 by means of gas lead connecting means 14 and liquid connecting means 12. Gas connecting means 14 are connected to that level of the system which is always above the liquid level and liquid lead 12 is connected to the system at a level which is always below the operating liquid level in said system. The access of gas from the system to the gauge is controlled by valve 42 and the access of liquid to gauge 10 is controlled by valve 44. When valves 42 and 44 are open the liquid level 11 in gauge 10 is the same as the liquid level 21 in system 20. Any conventional means may be employed to sealably connect the gauge glass 10 to connecting means 12 and 14 respectively. It is generally preferred however to utilize a combination of a sealing gland and means for holding and compressing same. In this common modification sealing glands 22 and 24 are placed near to the ends of glass 10 proximate to connecting means 12 and 24 respectively. The ends of connecting means 12 and 14 are usually threaded. Compression nuts 18 and 16 are placed over glands 22 and 24 respectively and screwed onto end ends of connecting means 12 and 14 respectively, whereby the glands 22 and 24 are compressed between the gauge glass 10 and connecting means 12 and 14 respectively. Deflecting means 30 is located proximate to but not in contact with the means connecting the gauge glass 10 to the gas connecting means 14. If desired, a similar deflector is similarly positioned proximate to but not in contact with the junction of gauge glass 10 with liquid connecting means 12. While it is generally preferred to utilize a deflector at both ends of the gauge glass the invention is not limited to an embodiment utilizing two deflectors. In the first embodiment of the system, the deflector 30 is substantially frustro conical in shape having an axial aperture 36 running therethrough. The deflector is located in such a manner that the smaller flat surface 32 proximate to the apex of the entire cone is located near the junction of the gauge glass 10 with the appropriate connecting means to system 20. The deflector 30 should be moveable upon the surface of gauge glass 10 but not readily so. The reason being that it should be possible to adjust the position of the deflector 30 upon gauge glass 10 when installing it but it should remain in position when subject to the impingement thereon of gas/liquid aerosol and liquid leaking from the junction to which it is proximate.

It is desirable that the inner surface of the deflector shall contact the surface of gauge glass 10 in such a way that no leakage is possible between the upper and lower surfaces. This criteron is subject to an apparent exception which will be discussed hereinbelow. It has been found that the deflector 30 preferably be made of fairly resilient and moderately heat resistant material. Absolute heat resistance is not required, however, it is desirable that the material will not disintegrate rapidly at temperatures of up to 400°F under repeated exposures of not in excess of 5 minutes per exposure.

While it is not the intention to limit the invention thereto, it has been found that synthetic rubbers such as, for example, neothene, teflon, rubber composition are suitable for this purpose. Also included are deflectors made of plastic, glass, clay, asbestos and sheet metal provided these are equipped with an inner ring washer to provide a tight leak-proof fit between the gauge glass 10 and the deflector 30.

Liquid/gas aerosol or liquid leaking from the junction of the liquid connecting means 12 or 14 respectively with gauge glass 10 would then be deflected away from the surface of gauge glass 10 which is thus kept clean and in permanently readable condition.

In a second sub-modification of the system as illustrated in FIGS. 3 and 4, it may be desirable to utilize a deflector which can be replaced without disassembly of the entire gauge system as would be necessary with the first embodiment. In this embodiment deflector 30' which is in all other respect similar to deflector 30, has a Z-slit 38 cut therein between the inner and outer circumferences running diagonally relative to the principal axis of rotation of the cone. This cut permits the deflector to be opened, and slipped onto gauge glass 10 due to the resilience of the material from which it is made. If it is borne in mind that the purpose of the invention is to deflect the flow of, say, water or steam, it will be seen that a vertical, that is to say, cut parallel to the axis of rotation, would not be satisfactory since this type of cut would have a tendency to permit the flow of water in a vertical direction. On the other hand, a cut in a diagonal plane would tend to lead the water to the outer edge of the deflector thus preventing contamination of the surface of the glass.

In a third sub-modification of the invention, the system may additionally comprise a spacer means for maintaining the separation of the deflector from the junction between gauge glass 10 and the pressure system connecting means. During the operation of the system there is a tendency for the deflector means to be slowly pushed away from the aforesaid junction. If this occurs the purpose of the deflector would be nullified. Hence, it is desirable, though by no means essential, to provide such a retaining means.

This retaining means may be either a hanger or hook means as illustrated in FIG. 5 and 5A or a means integrated with the gasket as shown in FIG. 6.

Any convenient means of retaining the deflector in position may be utilized. However, it is generally preferred to utilize a spring loaded ring system as illustrated in FIG. 5. In this embodiment a pair of arms 66 and 67 having hook means 68 and 69 thereon are located around one side of the outer surface of gauge glass 10 proximate to the base 34 of deflector 30. A second pair of connected arms 72 and 74 having eyelets 78 and 79 at the ends thereof are so located upon the other side of gauge glass 10 so that eyes 78 and 79 engage with hooks 68 and 69 in order to provide a ring around gauge glass 10. To the juncture of 66 and 67 is attached a spring loaded hook means 64, the other end of which is hooked about any convenient structural protuberance proximate to the juncture of the gauge glass and the gas connecting means 14. A similar spring loaded hook means 62 has one end thereof attached to the juncture of arms 72 and 74 and that equally is retained at the other end thereof.

It is particularly recommended that this additional modification be utilized when the split deflector of FIGS. 3 and 4 is utilized since the slip liability of this modification is somewhat greater than the slip liability of the modification of FIGS. 1 and 2.

The necessity for this spring modification can be eliminated by constructing a deflector which is integral with the gasket inserted between gauge glass 10 and connecting means 14 or 12, that is to say, gasket 24 or 22 respectively. In this modification there is provided a deflector 50 connected to gasket 54 by means of at least one, preferably two, connector strips 60. One end of said deflector strips 60 being attached to the smaller flat surface 52 of deflector 50 and the other end thereof connected to gasket 54. The gasket 54 is installed in the same manner as gaskets 24 and 22 and provides a permanent separation between the deflector and the gasket in the total system.

It should be noted that for the novel system of the present invention to be operative the deflectors should be proximate to but not on contact with the clamping means (i.e., compression nuts 18 and 16) between the gauge glass 10 and connecting means 12 and 14. The spacing is not critical but must be sufficient to allow the liquid or gas/liquid aerosol to come to atmospheric pressure, but not so great as to negate the deflector's function. These distances will of course vary according to the system. For example, in most steam boiler systems separation of the order of ¼ to ½ are preferred. The novel system will however be operative at say ⅛ to 1. inch. In order to maintain this separation, separators 70 may be attached to either surface 32 of deflector 30 or to the clamping means (i.e., nuts 18 and 16) to prevent direct contact of the surface thereof.

In a further modification as shown in FIGS. 8 and 9 a drip wire 80 may be fitted to deflector 30 to lead of the formed condensate to a convenient location.

I claim:

1. A liquid level gauge system for determining the level of liquid in a system utilizing the combination of liquids and gases at pressures exceeding atmospheric pressure, comprising:
   a. a transparent tubular gas gauge;
   b. a first tubular connecting means connected at one end thereof to said system, at a level above the normal liquid level and at the other end thereof, to said gauge glass;
   c. a first sealing means including at least a first gasket means, to substantially prevent the leakage of gas between one end of said gauge glass and said first connecting means;
   d. a second tubular connecting means connected at one end thereof to the pressure system at a level below the normal liquid level and at the other end thereof to the other end of said gauge glass;
   e. a second sealing means to substantially prevent the leakage of liquid between the other end of said gauge glass and said second connecting means;
   f. a frustro conical deflector means having an axial opening about its axis of rotation, the cross section of said opening being substantially equal to but not exceeding in shape and area that of the outer cross section of the gauge glass, said deflector means being located upon the gauge glass in such a manner that the gauge glass passes through axial opening in the deflector means; and,
   g. at least one strip means for intregally connecting said first gasket means to said deflector means, wherein said deflector means is supported by said gasket means, but separated by a predetermined distance therefrom when said gasket means is in position as part of said first sealing means.

2. A liquid level gauge system for determining the level of liquid in a system utilizing a combination of liquids and gases at pressures exceeding atmospheric pressure, comprising:
   a. a transparent tubular gauge glass;
   b. a first tubular connecting means connected at one end thereof to said system at a level above the normal liquid level and at the other end to the gauge glass;
   c. a first sealing means to substantially prevent the leakage of gas between one end of said gauge glass and said first connecting means;
   d. a second tubular connecting means connected at one end thereof to the pressure system at a level below the normal liquid level and at the other end thereof to the other end of said gauge glass;
   e. a second sealing means to substantially prevent the leakage of liquid between the other end of said gauge glass and said second connecting means;
   f. a frustro conical deflector means having an axial opening about its axis of rotation, the cross section of said opening being substantially equal to but not exceeding in shape and area that of the outer cross section of the gauge glass, said deflector means being located upon the gauge glass in such a manner that the gauge glass passes through the axial opening in the deflector means, and said deflector means having a small flat area thereon located proximate to but out of substantial surface-to-surface contact with a predetermined aforesaid sealing means; and,
   g. a deflector support means, including a ring means having a diameter larger than the diameter of said axial opening of said deflector means, but smaller than the greatest diameter across said deflector means and further including at least two arm means each having a hook at one end thereof and each arm being connected at the other end thereof to said ring means, wherein said hook means are adapted to engage said first connecting means and said ring means is located below said deflector means and adapted to give support thereto.

3. The system according to claim 2, further including:
   h. spring means located in each of said arm means intermediate said ring means and said hook means intermediate said ring means and said hook means.

4. A liquid level gauge system for determining the level of liquid in a system utilizing a combination of liquids and gases at pressures exceeding atmospheric pressure, comprising:
   a. a transparent tubular gauge glass;
   b. a first tubular connecting means connected at one end thereof to said system at a level above the normal liquid level and at the other end thereof to said gauge glass;
   c. a first sealing means to substantially prevent the leakage of gas between one end of said gauge glass and said first connecting means;
   d. a second tubular connecting means connected at one end thereof to the pressure system at a level below the normal liquid level and at the other end thereof to the other end of said gauge glass;
   e. a second sealing means to substantially prevent the leakage of liquid between the other end of said gauge glass and said second connecting means;
   f. a frustro conical deflector means having an axial opening about its axis of rotation, the cross section of said opening being substantially equal to but not exceeding in shape and area that of the outer cross section of the gauge glass, said deflector means being located upon the gauge glass in such a manner that the gauge glass passes through the axial opening in the deflector means, and said deflector means having a small flat area thereon located proximate to but out of substantial surface-tosurface contact with a predetermined aforesaid sealing means; and, g. a drip wire, including a substantially round body section and a leader section substantially perpendicular thereto, said substantially round body section having a diameter larger than the diameter of the axial opening of said deflector means but smaller than the greatest distance across said deflector means, said drip wire being adapted to rest upon said deflector means and to gather moisture collected thereon, said moisture thereafter being directed downwardly towards said leader section and subsequently away from said gauge system.

* * * * *